US012776612B2

(12) United States Patent
Arnault et al.

(10) Patent No.: US 12,776,612 B2
(45) Date of Patent: Oct. 27, 2026

(54) GROUNDING BRUSH ASSEMBLY WITH BRUSH FITTING PLATE HAVING TONGUES AND LUGS WITH DEFORMATIONS ON THE LUGS

(71) Applicant: AKTIEBOLAGET SKF, Gothenburg (SE)

(72) Inventors: Benoit Arnault, Saint-Cyr-sur-Loire (FR); Emmanuel Benevise, Monts (FR)

(73) Assignee: AKTIEBOLAGET SKF, Gothenburg (SE)

( * ) Notice: Subject to any disclaimer, the term of this patent is extended or adjusted under 35 U.S.C. 154(b) by 211 days.

(21) Appl. No.: 18/607,696

(22) Filed: Mar. 18, 2024

(65) Prior Publication Data

US 2024/0322508 A1 Sep. 26, 2024

(30) Foreign Application Priority Data

Mar. 24, 2023 (FR) ....................................... 2302820

(51) Int. Cl.
*H01R 39/24* (2006.01)
*H01R 4/64* (2006.01)
(Continued)

(52) U.S. Cl.
CPC ............... *H01R 39/24* (2013.01); *H01R 4/64* (2013.01); *H01R 39/385* (2013.01); *H01R 39/39* (2013.01);
(Continued)

(58) Field of Classification Search
CPC .......... H02K 5/14; H02K 5/145; H02K 5/161; H02K 5/15; H02K 5/16; H02K 5/163;
(Continued)

(56) References Cited

U.S. PATENT DOCUMENTS 3,564,477 A * 2/1971 Pompei ................ H01R 39/643
439/271
3,757,164 A * 9/1973 Binkowski ................ H05F 3/02
361/221

(Continued)

FOREIGN PATENT DOCUMENTS

CN 213576191 U 6/2021
DE 102021114965 A1 12/2022

(Continued)

OTHER PUBLICATIONS

Preliminary Search Report from the French Patent Office dated Oct. 31, 2023 in related French application No. FR2302820, including Search Report and Written Opinion.

*Primary Examiner* — Maged M Almawri

(74) *Attorney, Agent, or Firm* — J-TEK LAW PLLC; Scott T. Wakeman; Mark A. Ussai

(57) ABSTRACT

A grounding brush assembly includes a grounding brush having a support and a plurality of conductive fibers fitted inside the support and a brush fitting plate connected with the support of the brush. The fitting plate includes a plurality of retention tongues retention of the support of the brush, a radial portion and a plurality of lugs which extend from the radial portion and which define the outer diameter of the fitting plate. At least one local deformation is formed on one of the lugs of the fitting plate and extends radially inwardly toward the interior of the grounding brush assembly.

11 Claims, 8 Drawing Sheets

(51) Int. Cl.

| | |
|---|---|
| ***H01R 39/38*** | (2006.01) |
| ***H01R 39/39*** | (2006.01) |
| ***H01R 39/64*** | (2006.01) |
| ***H02K 11/40*** | (2016.01) |
| ***H05F 3/02*** | (2006.01) |

(52) U.S. Cl.
CPC ............. *H01R 39/64* (2013.01); *H02K 11/40* (2016.01); *H05F 3/02* (2013.01); *H01R 2201/10* (2013.01)

(58) Field of Classification Search
CPC .......... H02K 5/165; H02K 5/132; H02K 5/24; H02K 11/40; H02K 11/00; H02K 11/026; H02K 11/028; H02K 13/00; F16C 41/002; F16C 19/52; F16C 2380/26; H01R 39/24; H01R 4/64; H01R 39/38; H01R 39/385; H01R 39/39; H01R 39/64; H01R 2201/10; F05F 3/02
USPC .......................................................... 310/239
See application file for complete search history.

(56) References Cited

U.S. PATENT DOCUMENTS 4,521,708 A * 6/1985 Vandevier .............. H02K 5/167 310/90
5,961,222 A * 10/1999 Yabe ..................... F16C 33/586 384/477
6,686,673 B1 * 2/2004 Komura ................. H02K 11/40 310/90
7,528,513 B2 * 5/2009 Oh ......................... H02K 11/40 310/88
8,567,042 B2 * 10/2013 Neuroth ................... H02K 5/16 29/598
10,253,818 B1 * 4/2019 Ince .................... F16C 33/7843
10,931,179 B2 * 2/2021 Hubert ................... H01R 39/39
11,204,066 B2 * 12/2021 Feliciano .............. F16C 37/007
11,309,775 B2 * 4/2022 Hubert ................... H02K 11/40
11,549,556 B2 * 1/2023 Berruet ................... F16C 19/52
11,773,908 B1 * 10/2023 Kovacs ................... F16C 19/14 384/513
11,885,377 B2 * 1/2024 Kovacs ................. F16C 33/583
2004/0233592 A1 * 11/2004 Oh ......................... H02K 11/40 361/23
2014/0064651 A1 * 3/2014 Beyfuss ................ F16C 35/067 384/535
2015/0256054 A1 * 9/2015 Northwall .............. H02K 11/40 310/68 C
2016/0111941 A1 * 4/2016 Sturm .................... H02K 11/40 310/68 R
2017/0353087 A1 12/2017 Magno Dos Santos et al.
2019/0123609 A1 * 4/2019 Wilcox ................... F04D 13/08
2021/0021180 A1 1/2021 Hubert et al.
2021/0044178 A1 * 2/2021 Weber .................... H02K 11/40
2021/0310517 A1 * 10/2021 Berruet .................. H01R 39/39
2021/0310518 A1 * 10/2021 Berruet ................. F16C 41/002
2021/0310520 A1 * 10/2021 Arnault ................. F16C 35/077
2021/0364040 A1 * 11/2021 Arnault ................... F16C 19/52
2021/0364041 A1 * 11/2021 Berruet ................... F16C 19/52
2022/0294319 A1 9/2022 Arnault et al.
2023/0013562 A1 1/2023 Schamin et al.
2023/0223813 A1 * 7/2023 Arnault ................... F16C 19/52 310/89
2024/0283206 A1 8/2024 Arnault et al.
2024/0322509 A1 9/2024 Arnault et al.

FOREIGN PATENT DOCUMENTS

| | | | |
|---|---|---|---|
| DE | 102021207724 | A1 | 1/2023 |
| FR | 3120754 | A1 | 9/2022 |
| GB | 2160370 | A | 12/1985 |

* cited by examiner

GROUNDING BRUSH ASSEMBLY WITH BRUSH FITTING PLATE HAVING TONGUES AND LUGS WITH DEFORMATIONS ON THE LUGS

CROSS-REFERENCE

This application claims priority to French patent application no. 2302820 filed on Mar. 24, 2023, the contents of which are fully incorporated herein by reference.

BACKGROUND OF THE INVENTION

The present invention relates to grounding devices for controlling shaft current generated in motors or electrical machines, and more particularly to grounding brush assemblies.

In a motor or electrical machine including a housing and a rotary shaft, at least one roller bearing is fitted between the housing and the rotary shaft so as to rotatably support the shaft within the housing. During motor operation while the shaft rotates, a difference of electrical potential may appear between the shaft and the housing of the motor or other electrical machine, which may generate an electric current between the bearing inner ring disposed about the shaft and the bearing outer ring connected with the housing.

Any electric current passing through the components of the roller bearing can damage these components, in particular the rolling elements and the raceways provided on the inner and outer rings. The electrical discharges can also generate vibrations.

In order to eliminate these disadvantages, it is known to "earth" or ground the rotary shaft by using a brush or a grounding brush comprising conductive fibers. The grounding brush is generally fitted within the bore of the housing of the electric motor, such that the free ends of the fibers are in radial contact with the outer surface of the rotary shaft.

Due to the conductivity of the fibers, the brush is kept at the same electrical potential as the housing of the electric motor. The inner and outer rings of the roller bearing are also at the same electrical potential, which reduces or even eliminates the problematic electrical discharges through the roller bearing.

Such a grounding brush assembly is disclosed in US Patent Publication No. 2021/0021180 A1, which includes a grounding brush provided with a plurality of conductive fibers, a support inside of which the conductive fibers are fitted and annular fitting plate including a plurality of retention tongues for radial and axial retention of the support and an annular outer flange radially surrounding the brush and the tongues. The retention tongues are formed by cutting and plastic deformations of a radial portion of the fitting plate, which is supported axially on the support.

Conventionally, in order to fit or install the brush assembly inside the bore of the housing of the electric motor, a cylindrical tool is used, which is positioned radially between the support of the brush and the outer flange of the fitting plate and is supported axially against the radial portion of the fitting plate.

For an electric motor with a reduced radial space between the housing and the rotary shaft, it is typically not possible to place the tool in the desired manner for fitting or installation of the brush assembly due to the reduced radial distance between the flange of the fitting plate and the support and retention tongues of the fitting plate.

Also, it is generally not possible to support the tool against the free end of the outer flange of the fitting plate since the flange radial thickness is also reduced due to the radial compactness, i.e., decreased radial space, between the housing and the rotary shaft. Further, it is also undesirable to position the fitting tool against the end of the retention tongues of the fitting plate as this may result in deformation of the support and the conductive fibers of the brush.

As such, there is a need for a grounding brush assembly designed for electric motors having a reduced radial space between the housing and the rotary shaft.

SUMMARY OF THE INVENTION

The present invention is a grounding brush assembly comprising a grounding brush provided with a plurality of conductive fibers, and a support inside which the conductive fibers are fitted. The assembly also comprises a brush fitting plate which is connected with the support of the brush.

The fitting plate includes a plurality of retention tongues for retention of the support of the brush, a radial portion and a plurality of lugs which extend from the radial portion. The plurality of lugs are spaced from one another in the circumferential direction, are offset radially toward the exterior relative to the retention tongues and collectively define the outer diameter of the fitting plate.

According to a general characteristic of the present invention, at least one local deformation is formed on one of the lugs of the fitting plate and extends radially inwardly toward the interior.

The at least one local deformation locally increases the contact surface between the fitting plate and a tool used during the fitting or installation of the brush assembly within the bore of the housing of the electric motor.

The increase in contact surface provided by the local deformations limits or reduces the risk of deformation of the lugs of the fitting plate during installation of the grounding brush assembly. In addition, the axial force applied to the fitting plate is situated or located in an area spaced from the support and from the conductive fibers. The support and the conductive fibers are therefore not deformed during the fitting process.

With the present invention, it is possible to provide a brush assembly with a reduced radial size.

In addition, the local deformation(s) of the fitting plate also provides an anti-rotation function for the grounding brush assembly. That is, a protuberance with a corresponding form may be provided on the bore of the housing of the associated electric motor and which engages or interacts with a local deformation to prevent rotation of the grounding brush assembly.

According to one embodiment, each local deformation extends from the free end of the associated lug of the fitting plate. The local deformation may be formed on a part or portion of the axial length of the associated lug of the fitting plate.

Alternatively, each local deformation may be formed on the entire axial length of the associated lug of the fitting plate. In this case, the deformation reinforces the rigidity of the associated lug.

According to another embodiment, each local deformation is axially spaced from the free end of the associated lug of the fitting plate.

The local deformation may be in the form of a hollow which is oriented radially outwardly toward the exterior.

According to one embodiment, a plurality of local deformations are each formed on the lugs of the fitting plate, the local deformations each extending radially inwardly toward the interior and being offset relative to one another in the circumferential direction.

Preferably, each local deformations is formed on a separate one of the lugs of the fitting plate.

According to one embodiment, the retention tongues of the fitting plate extend from the radial portion of the fitting plate. Alternatively, the retention tongues of the fitting plate may extend from another portion of the fitting plate.

According to one embodiment, the support and the fitting plate are two distinct parts that are connected together by the retention tongues. Alternatively, the support and the fitting plate may be produced in a single piece or integrally formed.

According to one embodiment, the radial portion of the fitting plate is supported axially against the support of the brush. Alternatively, another radial portion of the fitting plate may be supported axially against the support of the brush.

The present invention also concerns an electric motor comprising a housing, a shaft, and at least one grounding brush assembly as previously defined, the grounding brush assembly being fitted radially between the housing and the shaft and the conductive fibers of the brush of the assembly being in contact with the shaft.

BRIEF DESCRIPTION OF THE SEVERAL VIEWS OF THE DRAWINGS

The present invention will be better understood by studying the detailed description of embodiments, taken by way of non-limiting examples, and illustrated by the appended drawings in which.

DETAILED DESCRIPTION OF THE INVENTION

Figure 1:
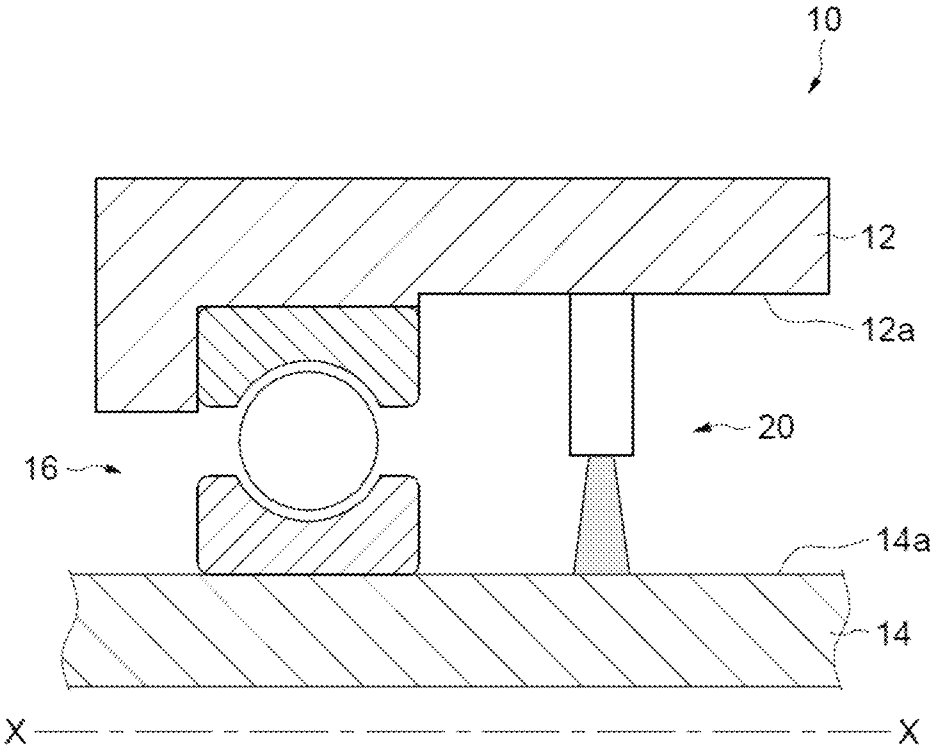
FIG. 1 is an axial cross-sectional view of a grounding brush assembly fitted radially between a rotary shaft and an electric motor housing.

FIG. 1 represents in axial cross-section a part of a motor 10, or another electrical machine, which basically comprises a fixed housing 12, a rotary shaft 14 rotatable about a central axis X-X, and a roller bearing 16 rotatably supporting the shaft 14 within the housing 12. In the illustrated embodiment, the bearing 16 is a ball bearing, but the bearing 16 may have any other types of rolling elements, such as cylindrical rollers, tapered roller, needles, etc., or the bearing 16 may even be formed as a plain bearing.

The motor 10 also comprises a grounding brush assembly 20 which is fitted radially between the bore 12*a* of the housing 12 and the cylindrical outer surface 14*a* of the rotary shaft 14. The grounding brush assembly 20 continually dissipates any electrical charges which accumulate on the shaft 14 of the motor 10 during motor operation by transferring these charges to the housing 12.

With reference to FIGS. 2-5, a description will now be provided of a grounding brush assembly 20 according to a first embodiment. The grounding brush assembly 20 has a generally annular form. The grounding brush assembly 20 comprises a grounding brush 30 and a brush fitting plate 40 which is configured to retain the brush 30 axially and radially.

The brush 30 comprises a plurality of individual conductive fibers 31, which are designed to be placed or distributed around the rotary shaft 14 of the motor 10. The conductive fibers 31 may be made of carbon, stainless steel, or a conductive plastic, such as acrylic or nylon fibers.

The brush 30 also includes a support unit or support 32 for retention or support of the fibers 31, inside of which the conductive fibers 31 are fitted or disposed. In the illustrated embodiment, the support 32 is in the form of an open ring. The support 32 may be made by cutting and stamping. The support 32 is preferably made of an electrically conductive material, such as, for example, aluminum, stainless steel, bronze, copper or another appropriate conductive material (e.g., a conductive plastic). Alternatively, the support 32 may be made of non-electrically conductive material and provided with a conductive coating or conductive paint.

Figure 5:
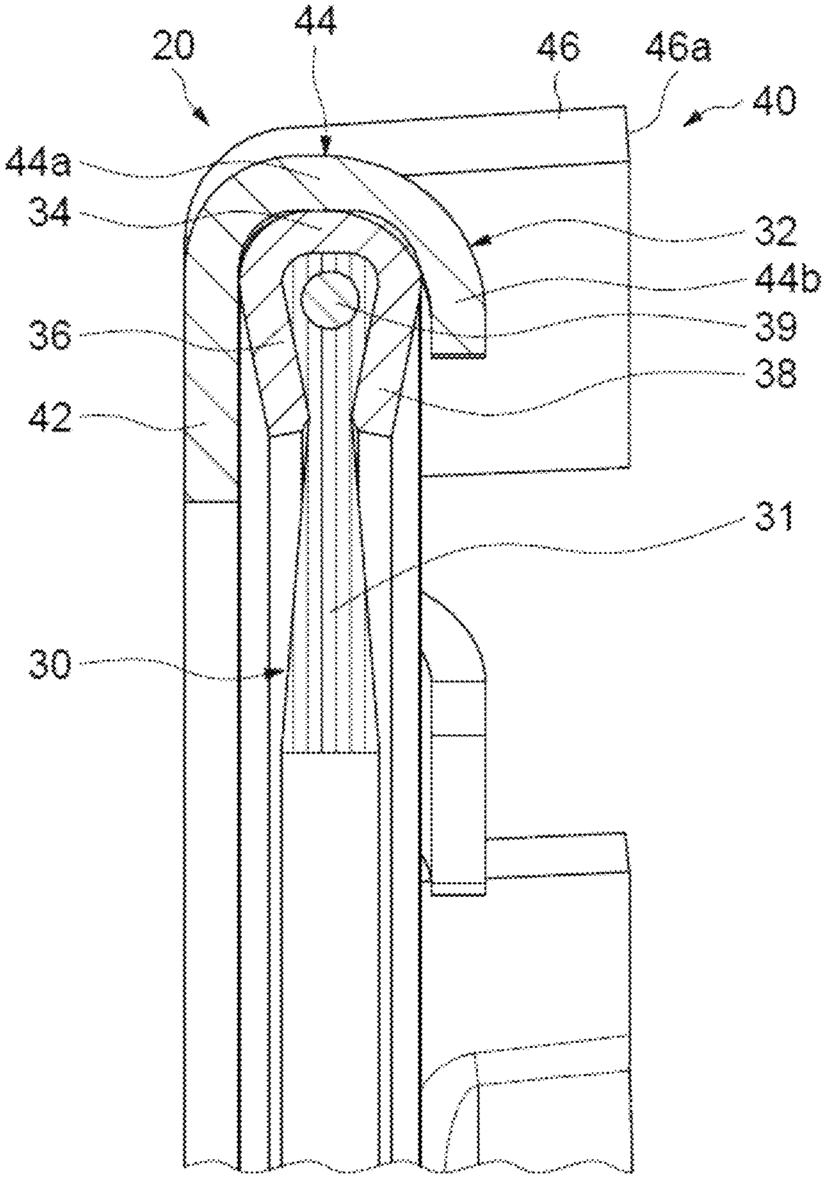
FIG. 5 is a cross-sectional view along the line V-V of FIG. 4.

As illustrated more clearly in FIG. 5, the support 32 includes an axial fitting portion 34 and two opposite lateral flanks 36, 38 extending radially inwardly from the fitting portion 34 towards the interior of the brush assembly 20, the flanks 36, 38 axially enclosing the conductive fibers 31. As such, the conductive fibers 31 are supported axially on both sides against the lateral flanks 36, 38.

The fitting portion 34 and the two lateral flanks 36, 38 delimit a channel (not indicated) which is open radially on an inner side, and inside which the conductive fibers 31 are partly situated or disposed.

In the illustrated example, the conductive fibers 31 are folded or bent around a connection wire 39 of the support 32. The distal free end(s) of the conductive fibers 31 are designed to come into radial contact with the outer surface 14*a* of the rotary shaft 14 of the motor 10. The proximal end of each conductive fibers 31 is in radial contact with the fitting portion 34 of the support 32.

The lateral flank 36 extends from an axial end of the fitting portion 34 and the lateral flank 38 extends from the opposite axial end of the fitting portion 34. The lateral flanks 36, 38 extend obliquely towards the interior from the fitting portion 34. The lateral flanks 36, 38 are preferably symmetrical with respect to each other relative to a median radial plane of the support 32. As shown, the fitting portion 34 preferably extends axially, but may alternatively extend obliquely. Alternatively, the lateral flanks 36, 38 may be formed asymmetrical.

Figure 2:
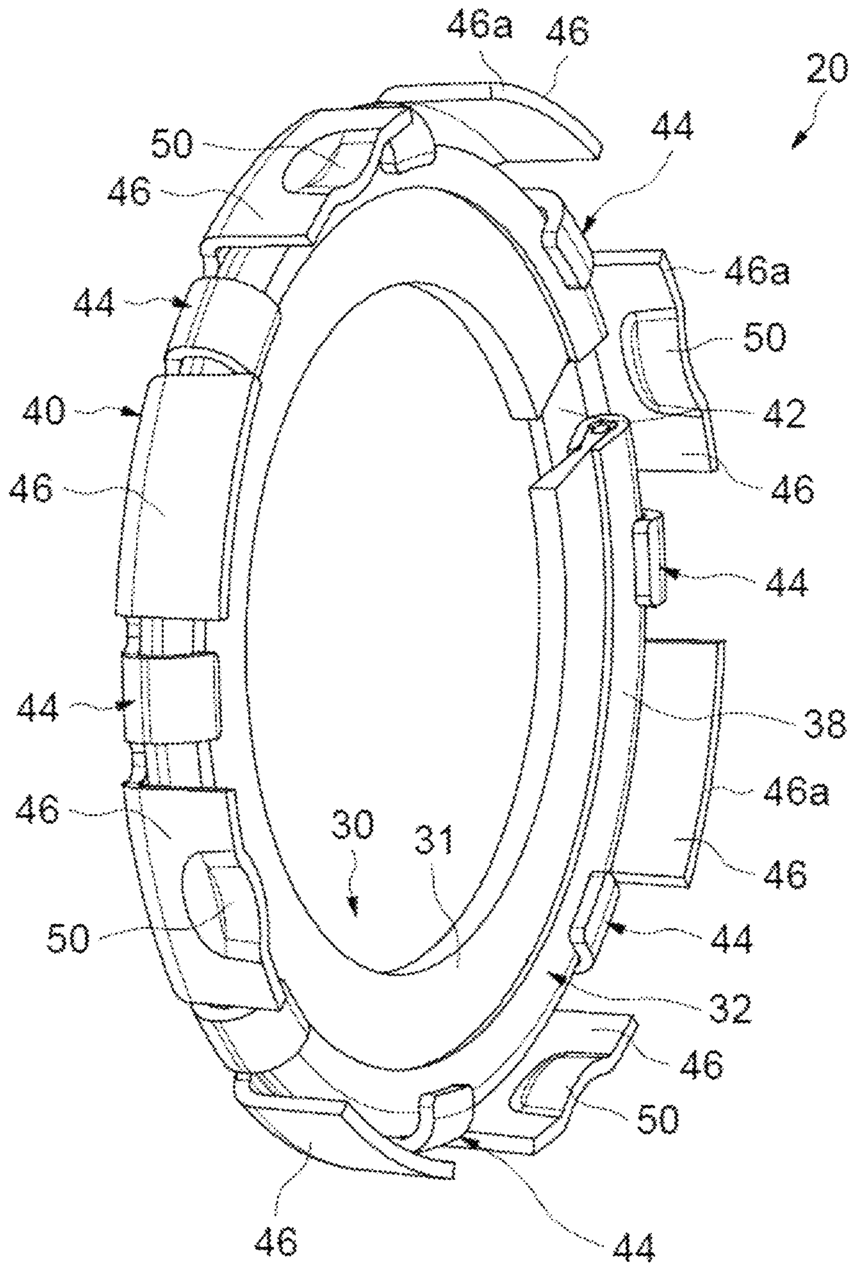
FIG. 2 is a front perspective view of a grounding brush assembly according to a first embodiment of the invention.
Figure 3:
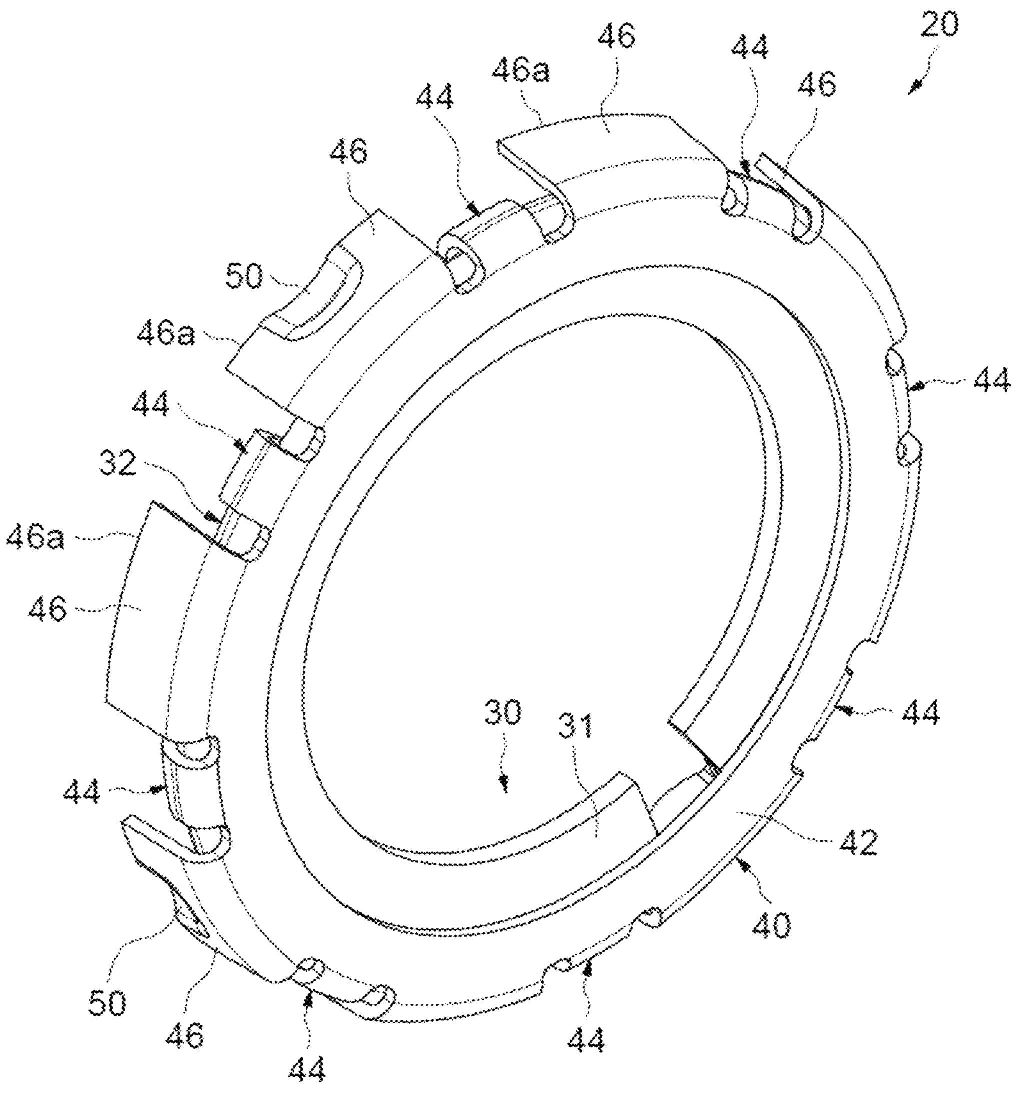
FIG. 3 is a rear perspective view of the grounding brush assembly according to the first embodiment of the invention.
Figure 4:
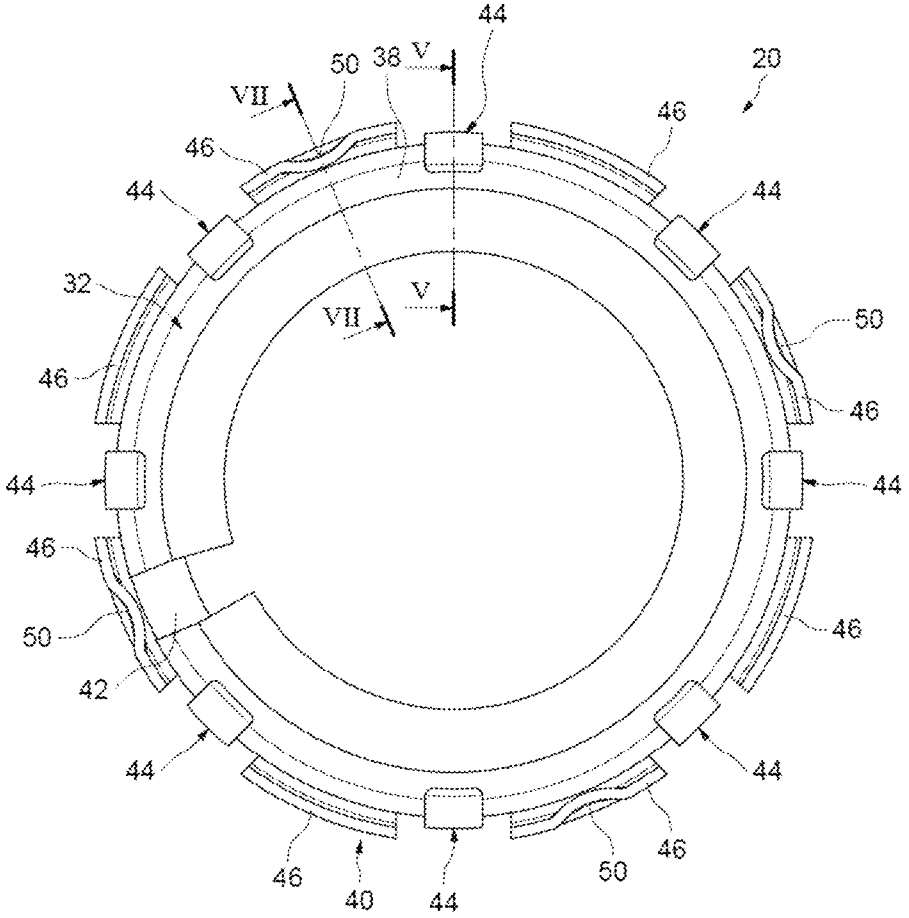
FIG. 4 is a front plan view of the grounding brush assembly of FIGS. 2 and 3.

The brush 30 is in the form of an open ring having first and second ends spaced circumferentially apart and facing each other, as shown in particular in FIGS. 2-4. Circumferential spacing of this type between two ends of the brush 30 enables the brush 30 to adapt to different diameters of the shaft 14 of the motor 10.

In general, the first and second circumferential ends of the brush 30 are not secured or connected to one another, but may be in contact with each other. As a variant, the first and second circumferential ends of the brush 30 may be secured or attached to each other.

The fitting plate 40 of the brush assembly 20 includes an annular radial portion 42 and a plurality of tongues 44 configured to axially and radially retain the brush 30 and extending from the radial portion 42.

As will be described in greater detail below, the fitting plate 40 also includes a plurality of lugs 56 extending from the radial portion 42, the lugs 56 being circumferentially spaced apart.

The fitting plate 40 is preferably fabricated by cutting and stamping. The fitting plate 40 is preferably formed of a conductive material, such as, for example, aluminum, stainless steel, bronze, copper or another appropriate conductive material. Alternatively, the fitting plate 40 may be made of a non-electrically conductive material and provided with a conductive coating or a conductive paint.

The radial portion 42 of the fitting plate 40 is supported axially against the support 32 of the brush 30. More specifically, the radial portion 42 is supported axially against the lateral flank 36 of the support 32.

The retention tongues 44 are circumferentially spaced apart from each other, preferably regularly or evenly. Alternatively, the tongues 44 may be irregularly circumferentially spaced or staggered. In the illustrated embodiment, the fitting plate 40 has eight tongues 44. Alternatively, the fitting plate 40 may have a greater or lesser number of tongues 46. It is possible to provide only two tongues 46 or at least four tongues 46. Preferably, the fitting plate 40 has at least two tongues 46.

Each tongue 44 projects or extends axially relative to the radial portion 42. Each tongue 44 locally radially surrounds the support 32 of the brush 30 and is in radial contact with the fitting portion 34 of the support 32. The support 32 is maintained supported axially against the radial portion 42 of the fitting plate 40 by the tongues 44. The tongues 44 enable the axial and radial retention of the grounding brush 30. The lateral flank 36 of the support 32 is supported against the radial portion 42 of the fitting plate 40, and the lateral flank 38 is supported against the tongues 44. Preferably, the tongues 44 are substantially identical to each other.

Each retention tongue 44 includes an axial portion **44*a* extending axially from the radial portion 42 of the fitting plate 40, the axial portion 44*a* locally radially surrounding and being in radial contact with the support 32. Each tongue 44 also includes a radial portion 44*b* folded back radially inwardly toward the interior of the grounding brush assembly 20, which is provided at the free end of the axial portion 44*a*. The folded-back or radial portion 44*b* of each tongue 44 enables the axial retention of the support 32 of the grounding brush 30. The folded-back/radial portion 44*b* of each tongue 44 is in axial contact against the lateral flank 38 of the support 32**.

Each lug 46 of the fitting plate 40 prolongs or extends axially from the radial portion 42. Preferably, the lugs 46 extend axially from a large diameter edge of the radial portion 42. In the depicted embodiment, the lugs 46 extend axially on the same axial side of the radial portion 42 as the tongues 44. Alternatively, the lugs 46 may extend axially from an axial side of the radial portion 42 opposite to the tongues 44.

Each lug 46 locally radially surrounds and is radially spaced from the support 32 of the brush 30. The lugs 46 are offset radially outwardly towards the exterior of the grounding brush assembly 20 partly relative to the tongues 44. As depicted, the lugs 46 are preferably substantially identical to each other. The lugs 46 collectively define an outer diameter of the fitting plate 40. In the depicted embodiment, each lug 46 extends axially. Alternatively, the lugs 46 may extend obliquely. Each lug 46 is in the form of a portion of a cylinder. The bore of each lug 46 is spaced radially from the support 32 by a non-zero radial distance. The outer surfaces of the lugs 46 collectively define the outer surface of the fitting plate 40. The lugs 46 permit centering of the fitting plate 40 after fitting of the grounding brush assembly 20 within the bore **12*a* of the housing 12 of the associated electric motor 10**.

As illustrated in FIGS. 2-4, the retention lugs 46 are circumferentially spaced apart from each other, preferably regularly or evenly. Alternatively, the lugs 46 may be irregularly circumferentially spaced or staggered. Each lug 46 is situated or disposed in the circumferential direction between two immediately successive tongues 44. Each lug 46 is spaced in the circumferential direction from the two immediately adjacent tongues 44. In the depicted embodiment, each lug 46 has a circumferential dimension which is greater than a circumferential dimension of each tongue 44.

The fitting plate 40 also comprises a plurality of local deformations 50 which are formed on the lugs 46 and extend radially inwardly toward the interior of the assembly 20. Each local deformation 50 is preferably formed on a separate one of the lugs 46. In other words, a single local deformation 50 is provided per lug 46.

Each local deformation 50 extends radially inwardly toward the interior from the outer surface of the associated lug 46. Each local deformation 50 is formed by local forcing back or deforming of the associated lug 46 radially inwardly toward the interior. Each local deformation 50 defines on the associated lug 46 a depression or hollow which is oriented radially toward or faces the exterior. Each local deformation 50 does not open out radially onto the bore of the associated lug 46. Each local deformation 50 projects radially inwardly toward the interior relative to a remainder of the associated lug 46.

In the illustrated embodiment, each local deformation 50 extends axially from the free end **46*a* of the associated lug 46. Each local deformation 50 extends axially along a portion of an axial length of the associated lug 46. As such, each local deformation 50 remains axially spaced from the radial portion 42**.

Preferably, the local deformations 50 are substantially identical to each other. The local deformations 50 are circumferentially spaced apart from each other, preferably regularly or evenly. Alternatively, the local deformations 50 may be irregularly or unevenly circumferentially spaced. In the illustrated embodiment, there are four deformations 50. Alternatively, it is possible to provide a greater or lesser number of deformations 50. For example, the fitting plate 40 may include only a single deformation 50, at least two deformations 50 which are preferably diametrically opposite to each other, or at least four deformations 50. It is also possible to provide more than one deformation 50 per lug 46.

Figure 6:
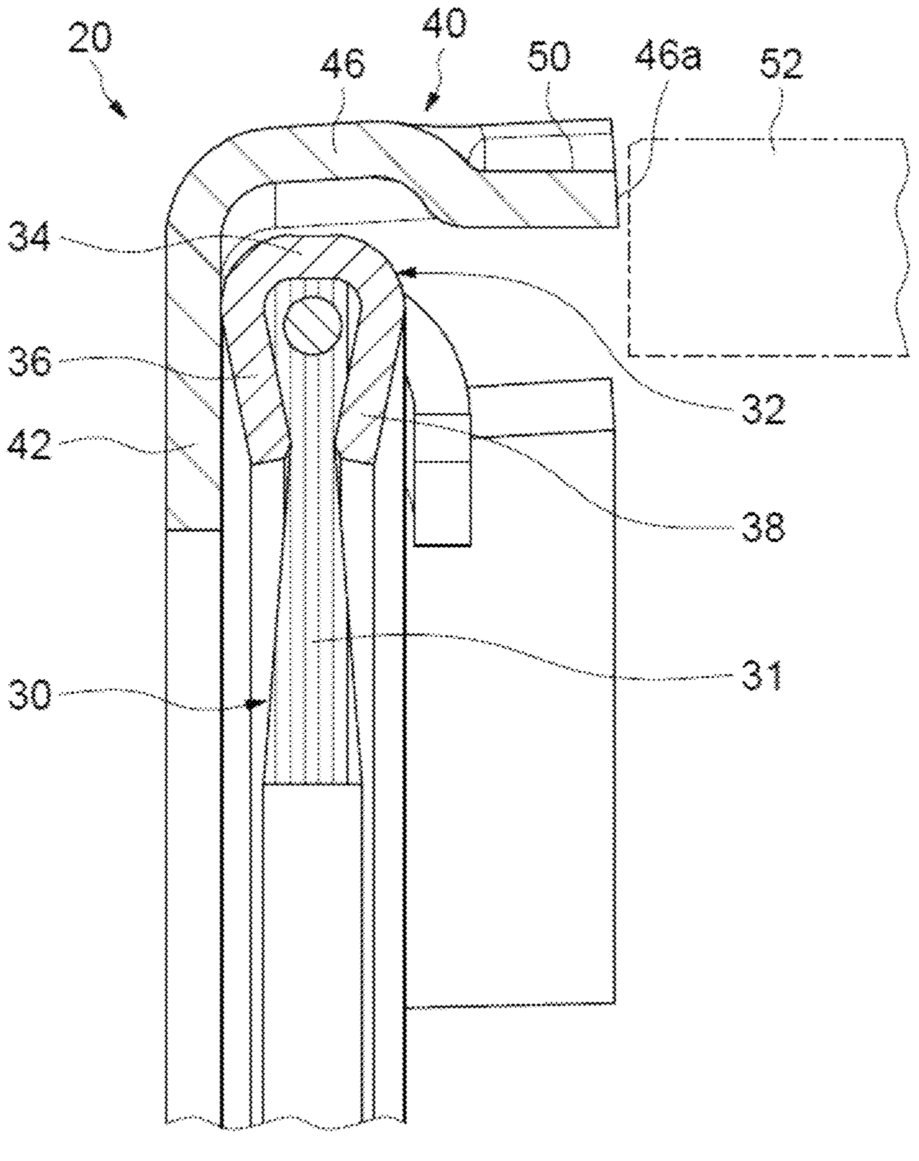
FIG. 6 is a cross-sectional view along the line VI-VI of FIG. 4.

In order to fit the grounding brush assembly 20 inside of the bore **12*a* of the housing 12 of the associated electric motor 10, a cylindrical fitting tool 52 is preferably used, as represented partly in broken lines in FIG. 6. The tool 52 is positioned so as to be supported axially against the free ends 46*a* of the lugs 46, in order to be able to thrust or push the assembly 20** axially.

The local deformations 50 provide an increase in the contact surfaces between the lugs 46 of the fitting plate 40 and the tool 52, which facilitates installation of the brush assembly 20 within the housing 12 of the associated electric motor 10, and without deformation of the support 32 and the conductive fibers 31.

Figure 7:
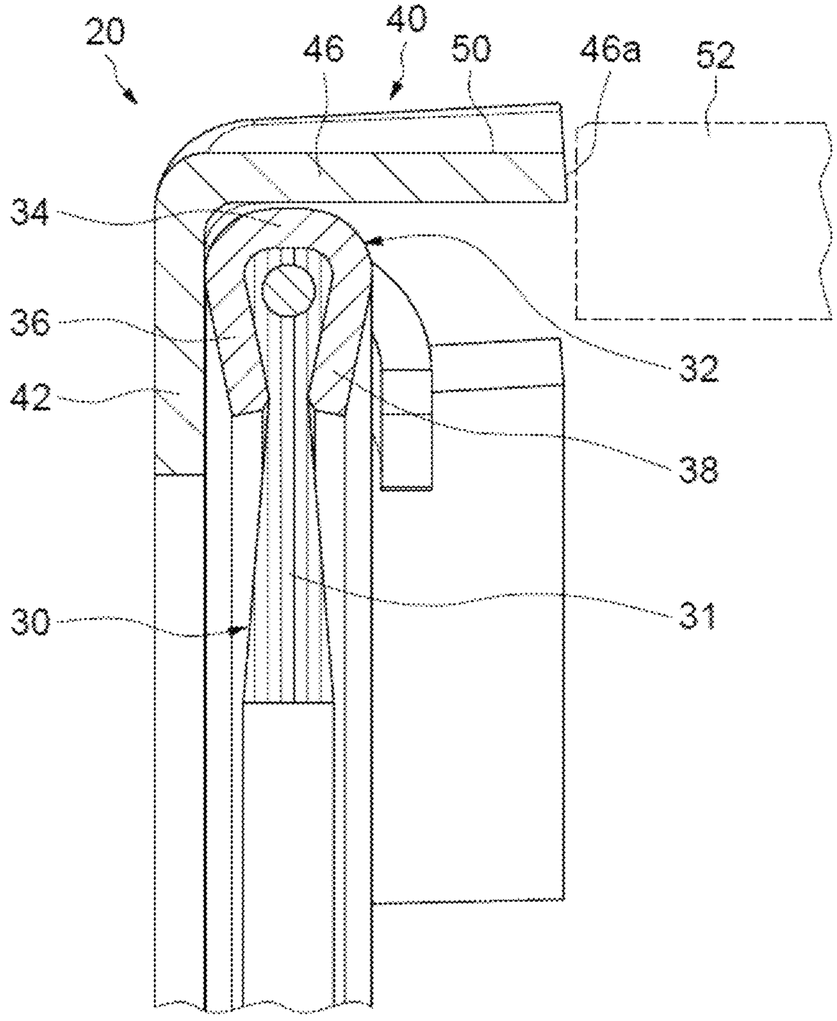
FIG. 7 is a cross-sectional view of a grounding brush assembly according to a second embodiment of the invention.
Figure 8:
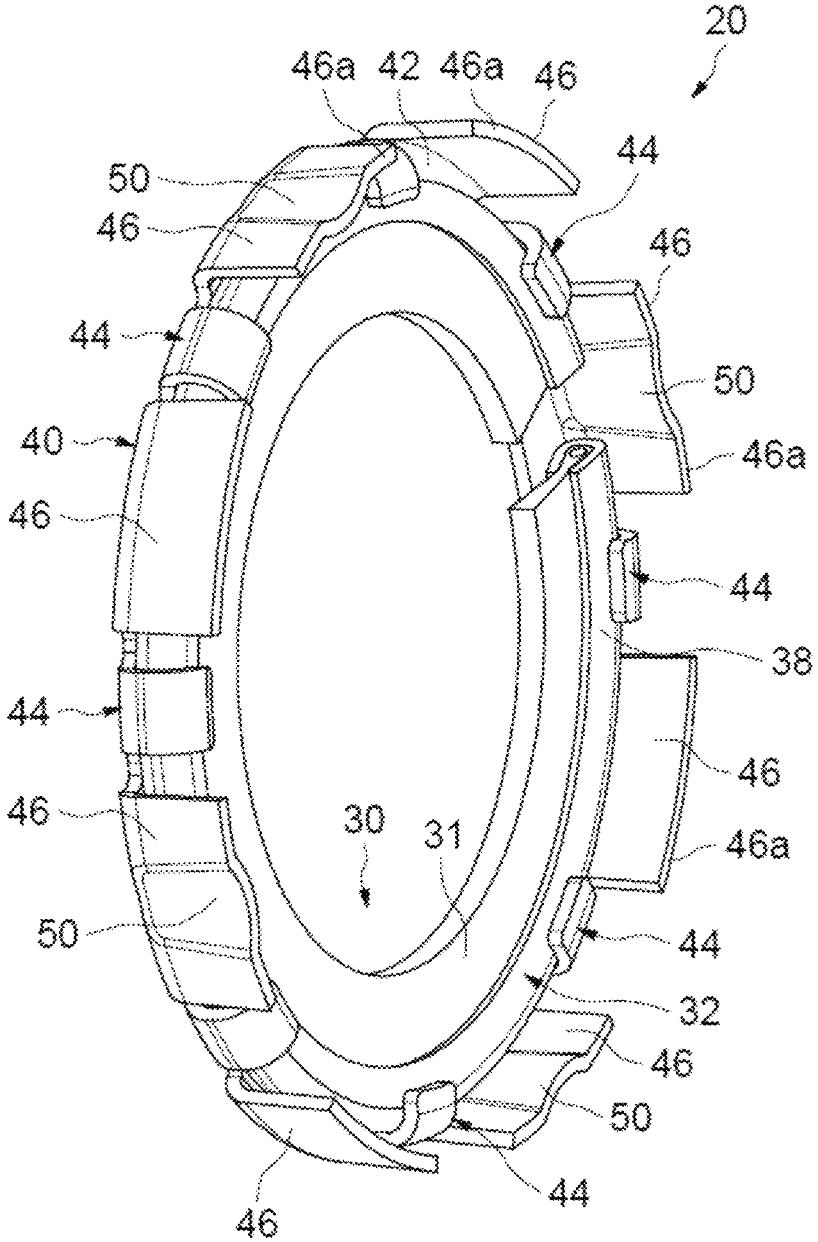
FIG. 8 is a perspective view of the grounding brush assembly of FIG. 7.

The embodiment illustrated in FIGS. 7 and 8, in which identical elements bear the same reference numbers, differs from the first illustrated embodiment in that the local deformations 50 of the fitting plate 40 extend axially along the entire axial length of the associated lug 46. Specifically, the local deformations 50 extend axially from the free end 46*a* of the associated lug 46 to the radial portion 42 of the fitting plate 40.

In the illustrated embodiments, each local deformation 50 of the fitting plate 40 extends axially from the free end 46*a* of the associated lug 46. Alternatively, the local deformations 50 of the fitting plate 40 may be spaced from the free ends 46*a* of the lugs 46.

As previously indicated, the local deformations 50 formed on the lugs 46 extend radially inwardly toward the interior and do not open out radially onto the bore of the lugs 46. In the illustrated embodiments, the deformations 50 also do not open out in the axial direction. Alternatively, each deformation 50 could open out in the axial direction on at least one axial side of the deformation 50.

Preferably, the fitting plate 40 is fabricated by cutting and stamping and the local deformations 50 are formed by local forcing back or deformation of a portion of the material of the lugs 46. Alternatively, the fitting plate 40 may be formed by another production process, for example, by casting, molding or additive production, i.e. by any production process based on the construction of the fitting plate 44 layer by layer by addition of material. In these cases, the local deformations 50 are obtained or formed during the production of the entire fitting plate 40.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers fitted at least partially inside the support; and a brush fitting plate connected with the support of the grounding brush, the fitting plate including a plurality of retention tongues configured to retain the support of the brush, a radial portion, a plurality of lugs extending from the radial portion, the plurality of lugs being spaced circumferentially apart, offset radially outwardly from the plurality of retention tongues and defining the outer diameter of the fitting plate, and at least one local deformation formed on one of the plurality of lugs and extending radially inwardly.

2. The assembly according to claim 1, wherein the at least one local deformation extends from the free end of the one lug of the fitting plate.

3. The assembly according to claim 1, wherein the at least one local deformation is formed along a portion of an axial length of the one lug of the fitting plate.

4. The assembly according to claim 1, wherein the at least one local deformation is formed along an entire axial length of the one lug of the fitting plate.

5. The assembly according to claim 1, wherein the local deformation defines a hollow facing radially outwardly from the one lug.

6. The assembly according to claim 1, wherein the plurality of retention tongues extend from the radial portion of the fitting plate.

7. The assembly according to claim 1, wherein the radial portion of the fitting plate is supported axially against the support of the brush.

8. An electric motor comprising:

a housing;

a shaft; and the grounding brush assembly according to claim 1, the grounding brush assembly being fitted radially between the housing and the shaft, the conductive fibers of the brush of the assembly being in contact with the shaft.

9. The assembly according to claim 1, wherein each one of the plurality of lugs is engageable with a bore of a housing to center the grounding brush assembly with the bore and the at least one local deformation projects radially inwardly from a remainder of the one lug and is configured to be engaged by a tool to displace the grounding brush assembly axially during installation within the bore of the housing.

10. The assembly according to claim 1, wherein the at least one local deformation includes a plurality of local deformations formed on the plurality of lugs of the fitting plate, each one of the plurality of local deformations extending radially inwardly and the plurality of local deformations being circumferentially spaced apart.

11. The assembly according to claim 10, wherein the plurality of local deformations are each formed on a separate one of the plurality of lugs of the fitting plate.

* * * * *